(No Model.) 2 Sheets—Sheet 2.
A. L. WALKER.
Combined Rake and Tedder.
No. 237,218. Patented Feb. 1, 1881.
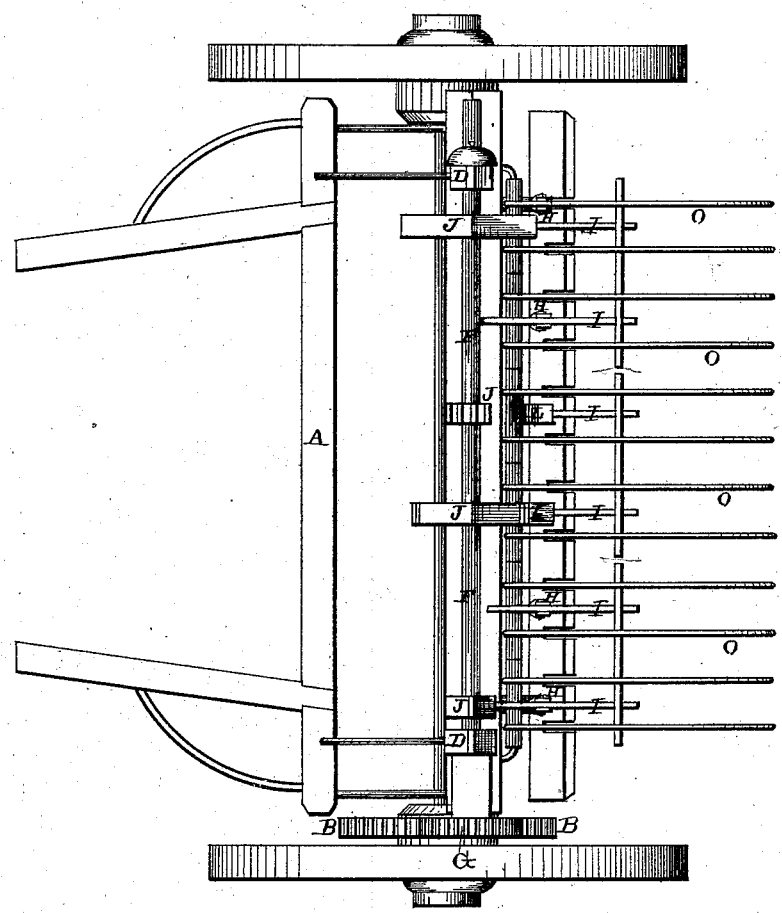

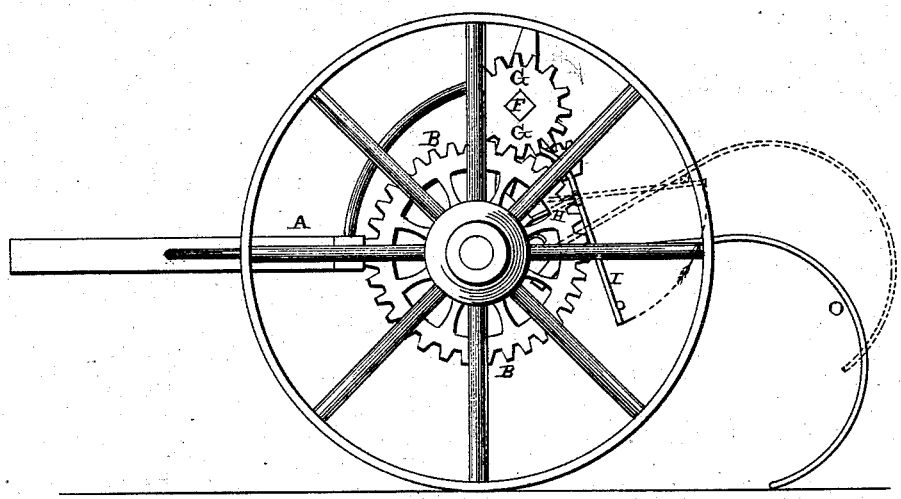
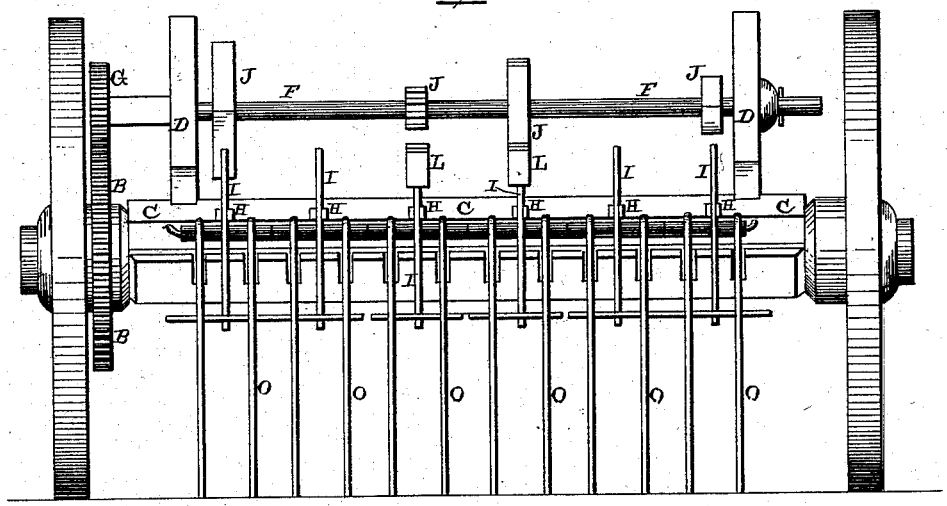

UNITED STATES PATENT OFFICE.

ABRAM L. WALKER, OF HINSDALE, NEW YORK.

COMBINED RAKE AND TEDDER.

SPECIFICATION forming part of Letters Patent No. 237,218, dated February 1, 1881.

Application filed August 3, 1880. (No model.)

*To all whom it may concern:*

Be it known that I, ABRAM L. WALKER, of Hinsdale, in the county of Cattaraugus and State of New York, have invented certain new and useful Improvements in Combined Hay Rake and Tedder; and I do hereby declare the following to be a full, clear, and exact description of the invention, such as will enable others skilled in the art to which it pertains to make and use it, reference being had to the accompanying drawings, which form part of this specification.

My invention relates to an improved combined hay rake and tedder; and it consists, first, in an attachment which can be secured to any or almost any of the horse-rakes now in use, whereby the rake is converted into both a rake and a tedder; second, in a shaft which is journaled in suitable bearings above the axle, and which is operated by a driving-wheel that is secured to the axle, and which shaft is provided with suitable segments, cams, or other suitable devices, whereby levers which have cross-heads at their rear ends for catching under the teeth, and suitable devices secured to their front ends for engaging with the segments or other devices on the shaft, are made to alternately lift the rake-teeth in any desired number at a time, enabling the hay-rake to be also used as a tedder.

The object of my invention is to provide an attachment which can be applied to any of the hay-rakes now in use, so as to enable the rake to be used either as a rake or a tedder, as may be desired, and thus save the expense of buying both of these implements.

Figure 1 is a side elevation of my invention. Fig. 2 is a rear view of the same. Fig. 3 is a plan view.

A represents a horse hay-rake of any desired construction, and which has a gear-wheel, B, secured to one of the driving-wheels. Upon the top of the beam C are secured the two uprights, D, in which uprights is journaled the shaft F, which is provided with a pinion, G, at one end, for engaging with the gear-wheel B on the axle. Upon this shaft are secured any desired number of segments, cams, or other suitable devices, J, which are placed at different angles, and which are alternately brought into operation as the shaft is revolved.

Projecting outward from the rear side of the beam C, at any suitable angle, are a number of bearings or supports, H, in which are pivoted the levers I. These levers I have their front ends projecting forward, and are provided with suitable segments L, so as to engage with the segments on the shaft, or have their front ends so shaped as to be acted on by the cams, where cams are used. Each one of these levers has a cross-head secured to its rear end, which cross-head catches under any suitable number of rake-teeth, O, so that each time that the lever is raised upward at its rear end by the action of the segments or cams on the shaft, the rake-teeth will be raised upward at the same time, so as to release the hay which they have gathered upon their lower ends as the machine is drawn along. These teeth are not all operated at once, but are operated alternately in groups or pairs, as may be desired, so as to more thoroughly stir up the hay without raking it into windrows.

When it is desired to use this machine as a rake alone, either the operating-shaft may be thrown out of gear with the driving gear-wheel, or the cams or segments may be so shifted upon the shaft as not to operate the levers.

By means of this attachment, which may be applied to any of the hay-rakes now in use, the rake may be converted into both a rake and a tedder, either one of which can be used at pleasure, and thus save the expense of buying two separate implements.

Having thus described my invention, I claim—

1. A horse hay-rake, in combination with a revolving shaft, which is provided with cams or segments, and a series of independent levers, which catch under the teeth of the rake with their rear ends, and which have their front ends operated upon by the cams or segments, whereby the pivoted rake-teeth are raised upward in pairs or groups, substantially as shown.

2. The combination of a horse hay-rake provided with a driving-gear, B, a shaft, F, provided with a pinion, G, and with suitable segments or cams, with the levers, which are operated by the segments or cams, and which, in turn, alternately raise the rake-teeth in groups or pairs, substantially as set forth.

3. The combination of the operating-levers, pivoted in suitable bearings, and provided at their rear ends with cross-heads for catching under the rake-teeth, with a suitable operating mechanism for alternately depressing the front ends of the levers and raising the rake-teeth in groups or pairs, substantially as specified.

In testimony that I claim the foregoing, I have hereunto set my hand this 20th day of July, 1880.

ABRAM L. WALKER.

Witnesses:
F. A. HAWLEY,
A. C. TORREY.